Patented July 22, 1941

2,250,255

UNITED STATES PATENT OFFICE 2,250,255

METHOD OF PURIFYING TRIMETHYLOLNITROMETHANE

Richard F. B. Cox, Wilmington, Del., assignor to Hercules Powder Company, Wilmington, Del., a corporation of Delaware No Drawing. Application October 25, 1939, Serial No. 301,232

7 Claims. (Cl. 260—635)

This invention relates to a method of purifying trimethylolnitromethane and more particularly to a method of crystallizing trimethylolnitromethane from water in the form of a hydrate, and to the product so formed.

Trimethylolnitromethane is a solid alcohol prepared by the condensation of nitromethane with formaldehyde. It was first prepared by L. Henry in 1895 (compt. rend. 121, 210). Its preparation has been described by later investigators using various procedures for carrying out the reaction, various catalysts and various methods of recovery, etc.

The crude trimethylolnitromethane reaction product obtained by any of the procedures described in the art is contaminated with intermediate reaction products, namely nitroethanol and dimethylolnitromethane as well as with tars and polymerization products of formaldehyde. Crystallization from organic solvents has been resorted to generally as a means of purification.

Crystallization from water or from aqueous reaction mixtures as trimethylolnitromethane has also been described in the prior art. In crystallizing from water a very concentrated solution, usually above 80 per cent by weight, has been necessary to crystallize out trimethylolnitromethane due to the high solubility of the latter in water. As a result, removal of intermediate reaction products and color bodies has been difficult by crystallization from water due to the limited amount of water which it has been necessary to use to effect crystallization.

One object of this invention is to provide an improved method of crystallizing crude trimethylolnitromethane from water.

Another object of the invention is to provide a method of crystallizing trimethylolnitromethane from water which effects more complete removal of tars and color bodies from the trimethylolnitromethane than hitherto known methods.

Another object of the invention is to prepare a hydrate of trimethylolnitromethane which is less soluble in water than anhydrous trimethylolnitromethane.

Other objects will appear hereinafter.

The above objects may be accomplished by cooling an aqueous solution of crude trimethylolnitromethane to a temperature below about 17° C. and above about −5° C., whereupon the trimethylolnitromethane separates in crystalline form as a hydrate. Due to the lower solubility of the hydrate than the anhydrous trimethylolnitromethane in water, crystallization as the hydrate is possible at much lower concentrations. Thus, a larger amount of water may be used for the crystallization and consequently a much larger proportion of intermediate products and color bodies are removed in the larger volume of mother liquor. The crystallization of trimethylolnitromethane as the hydrate in accordance with the process of this invention may desirably be carried out with aqueous solutions containing about 30 per cent to about 70 per cent of trimethylolnitromethane. Crystallization as the anhydrous trimethylolnitromethane, as practiced by the prior art, is only possible with aqueous solutions containing 70 per cent or more of trimethylolnitromethane.

The crude trimethylolnitromethane which may be used in the process of this invention may be the reaction product resulting from any of the methods of preparation of trimethylolnitromethane from nitromethane and formaldehyde or paraformaldehyde. The process will be particularly adaptable to the crude reaction product resulting from such processes in which the trimethylolnitromethane is associated with the intermediate reaction products, namely, nitroethanol and dimethylolnitromethane as well as tars and polymerization products.

In most cases the crude trimethylolnitromethane is prepared with use of catalysts. These catalysts may be alkali metal carbonates or hydroxides, alkaline earth metal hydroxides, etc. The salt of dimethylolnitromethane may also be present, having been formed by reaction of the dimethylolnitromethane with an alkaline catalyst.

In carrying out the procedure of the invention, it is sometimes desirable to first remove such catalysts which may be present in the crude product. I have found that most of such catalysts may be conveniently removed or destroyed by slightly acidifying the aqueous solution with an acid such as sulfuric acid. I have also found that some of the color bodies formed in the production of the trimethylolnitromethane are more soluble in alkaline than in acid media and are even precipitated in slightly acid solutions. I, therefore, find it desirable to acidify the aqueous solution of crude trimethylolnitromethane slightly and to remove any precipitate formed, preferably with use of a filter aid, such as active charcoal.

The trimethylolnitromethane hydrate formed in the process of my invention is stable only at temperatures below about 17° C. and decomposes above about that temperature to form a mixture of anyhydrous trimethylolnitromethane and a saturated solution thereof. The hydrate crystallizes in plates, whereas anhydrous trimethylolnitromethane crystallizes in needles. On drying crystals of the hydrate over sulfuric acid, for example, the loss of water was found to be about 25.8%, whereas the theoretical water content for a trihydrate would be 26.3%. The hydrate is, therefore, believed to be a trihydrate.

The crystals of trimethylolnitromethane hydrate may be removed from the mother liquor by any convenient means, such as by filtration or by centrifuging. The separated crystals of hydrate may then be melted by heating to above about 17° C. and recrystallized as the anhydrous trimethylolnitromethane by cooling to about 17° C. The mother liquor resulting from the crystallization may then be cooled to below about 17° C. so as to recover as the hydrate the trimethylolnitromethane which remains dissolved in the mother liquor. The mother liquor obtained after removing the crystallized hydrate may be used as a solvent for crystallization of more crude trimethylolnitromethane if desired. The additional crude trimethylolnitromethane may be added to the dilute mother liquor, warmed to dissolve, filtered and then cooled to below about 17° C. to crystallize the trimethylolnitromethane hydrate. This process may be repeated as many times as desirable until the concentration of impurities in the mother liquor interferes with the separation of the hydrate.

As specific illustrations of procedures in accordance with this invention, the following are typical:

Example I

A mixture of 61 grams of nitromethane, 255 grams of an aqueous solution of formaldehyde containing 35.4% by weight of formaldehyde and 0.3 gram of calcium hydroxide was reacted at a temperature of about 60° C., the formaldehyde solution being added gradually to the nitromethane in order to control the reaction. The reaction mixture was then held at about 60° C. for about 10 minutes. The reaction solution was then acidified with 1 cc. of a 30% by weight sulfuric acid solution and filtered to remove the calcium sulfate. The solution was then cooled to a temperature of —5° C. with stirring and the crystals of trimethylolnitromethane hydrate which formed were separated in a cold centrifuge. The moist trimethylolnitromethane hydrate obtained was 119 grams. It was melted by heating to a temperature of about 30° C. On cooling to about 17° C. anhydrous trimethylolnitromethane separated in the form of snow white crystalline needles. The crystals were separated from the water and dried.

Example II

Three hundred and fifty grams of trimethylolnitromethane from which free formaldehyde had been removed were dissolved in 350 cc. of water, treated with active charcoal and filtered. The solution was then cooled to 12° C., the first crystals separating in the form of plates. On cooling to 9° C., a thick slurry of crystals formed. These crystals were removed by centrifuging and the mother liquor cooled to 2° C. whereupon further amounts of crystals separated. These crystals were also removed by centrifuging. The uncombined water was removed from the crystals of the hydrate. The crystals contained 25.8% by weight of water.

Example III

Five hundred and seventy-six grams of a 52% by weight aqueous solution of crude trimethylolnitromethane from which the free formaldehyde had been removed were treated with fuller's earth and filtered. The solution was then cooled to a temperature of about 5° C. and the trimethylolnitromethane hydrate crystals separated by centrifuging. A yield of 238 grams of white crystals was obtained. These crystals contained about 25% of water. The mother liquor amounted to 324 grams and contained, on analysis, 37% by weight of trimethylolnitromethane. The white crystals were dried completely in vacuo over sulfuric acid to the anhydrous trimethylolnitromethane. The yield of dry trimethylolnitromethane was 59.4% of the total present in the original solution.

To demonstrate the advantage of crystallizing as the hydrate, 428 grams of an 87% by weight aqueous solution of the same crude trimethylolnitromethane as used in Example III above were clarified by filtration through fuller's earth and cooled to about 20° C. with stirring. The crystals of trimethylolnitromethane which separated were removed by centrifuging. They amounted to 113 grams when dry. The mother liquor amounted to 303 grams and contained, on analysis, 74% by weight of trimethylolnitromethane. The color of the trimethylolnitromethane separated from this concentrated solution was considerably darker than the crystals of trimethylolnitromethane hydrate separated in Example III or the anhydrous trimethylolnitromethane crystals obtained from the hydrate. The yield was 30.4% by weight of the trimethylolnitromethane present in the original solution as compared with 59.4% recovery in Example III.

As will be evident from the above description and examples, the crystallization of trimethyolnitromethane from water as the hydrate provides an improved method of separating trimethylolnitromethane from intermediate reaction products and color bodies usually present in the crude material.

It will be understood that the details and examples hereinbefore set forth are illustrative only and that the invention as herein broadly described and claimed is in no way limited thereby.

What I claim and desire to protect by Letters Patent is:

1. The method of separating trimethylolnitromethane from crude mixtures of the same which comprises cooling an aqueous solution of crude trimethylolnitromethane to a temperature below about 17° C. and above about —5° C. and removing the trimethylolnitromethane hydrate which crystallizes.

2. The method of separating trimethylolnitromethane from crude mixtures of the same which comprises cooling an aqueous solution of the crude trimethylolnitromethane to a temperature below about 17° C. and above about —5° C. and removing the trimethylolnitromethane hydrate which crystallizes, melting the hydrate crystals by heating above about 17° C. and cooling to about 17° C. to crystallize the anhydrous trimethylolnitromethane and removing the latter from the water.

3. The method of separating trimethylolnitromethane from crude mixtures of the same which comprises cooling an aqueous solution containing about 30% to about 70% by weight of crude trimethylolnitromethane to a temperature below about 17° C. and above about —5° C. and removing the trimethylolnitromethane hydrate which crystallizes.

4. The method of separating trimethylolnitromethane from crude mixtures of the latter which comprises slightly acidifying an aqueous solution containing about 30% to about 70% of the crude trimethylolnitromethane, removing the precipitated matter by filtration, cooling the solution to a temperature below about 17° C. and above about —5° C. and removing the trimethylolnitromethane hydrate which crystallizes.

5. The method of separating trimethylolnitromethane from crude mixtures of the latter which comprises cooling an aqueous solution of the crude trimethylolnitromethane to a temperature below about 15° C. and above about —5° C., removing the trimethylolnitromethane hydrate which crystallizes, adding more crude trimethylolnitromethane to the mother liquor obtained and repeating the procedure.

6. As a product, a hydrate of trimethylolnitromethane.

7. As a product, trimethylolnitromethane trihydrate.

RICHARD F. B. COX.